Patented Apr. 20, 1943

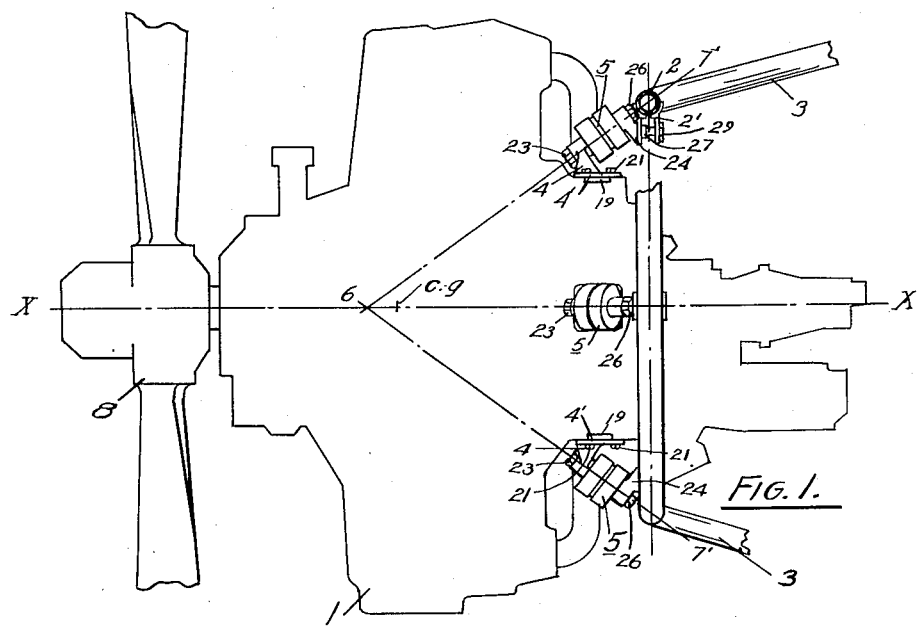
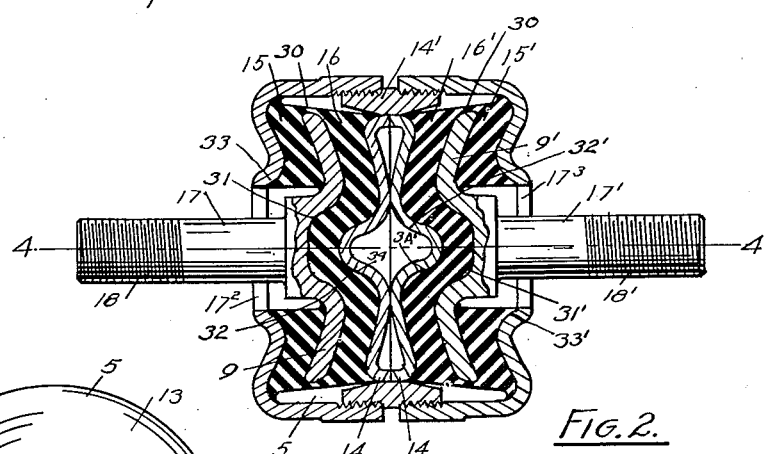
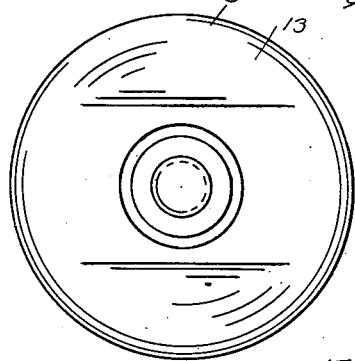

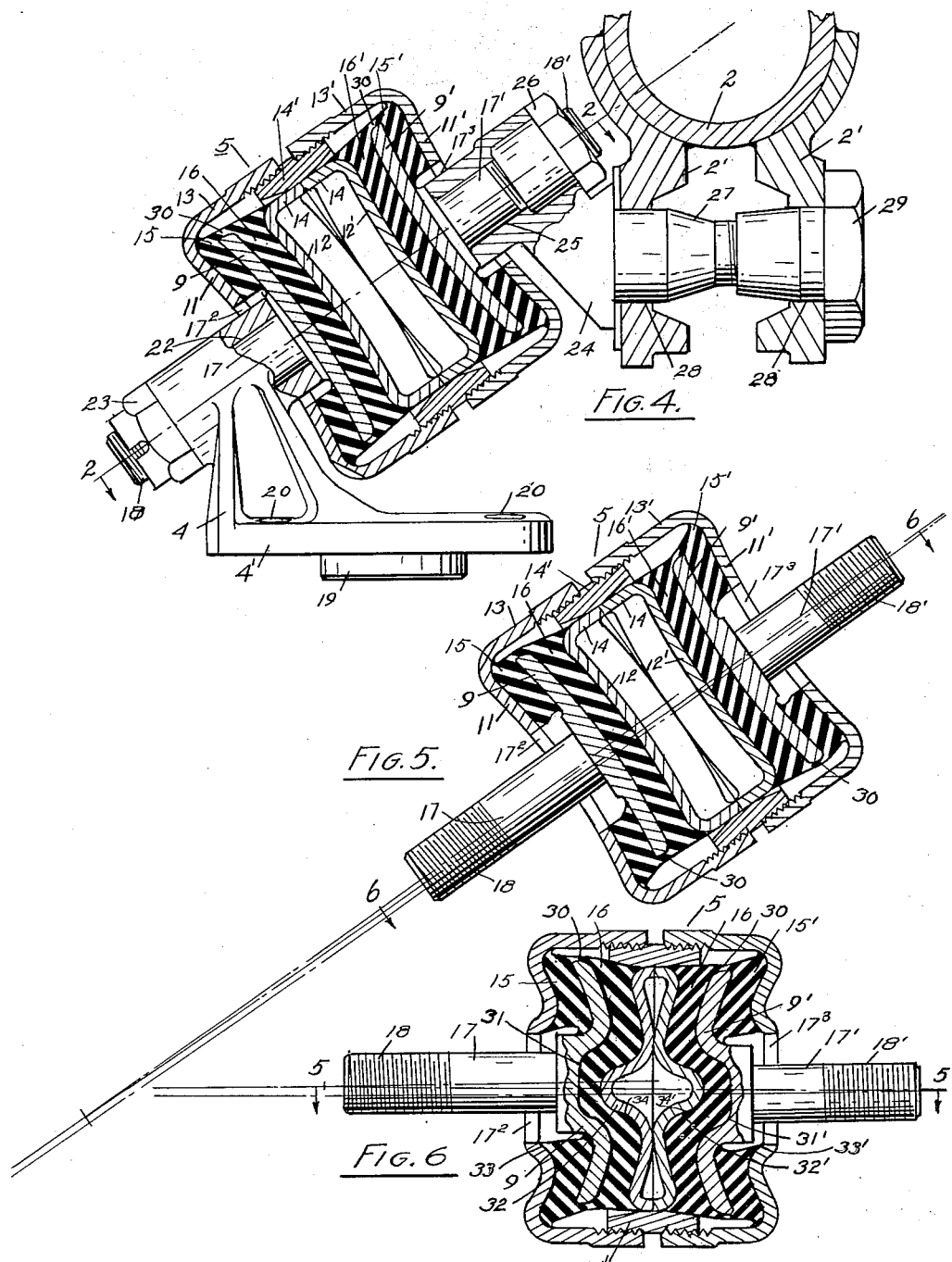

2,317,190

UNITED STATES PATENT OFFICE 2,317,190

MOUNTING

Richard C. Henshaw, Erie, Pa., assignor to Lord Manufacturing Company, Erie, Pa., a corporation of Pennsylvania Application October 5, 1940, Serial No. 359,916

10 Claims. (Cl. 248—5)

The present invention is directed to the improvement of mountings designed to quiet vibrations. Instruments subjected to vibrational disturbances respond to varying characteristics, each variation adding its peculiar problem and each of which must be satisfied to obtain the best results.

In the present invention a resilient element such as rubber is used as the medium for permitting freedom of action and as to some features of vibration satisfied the vibratory movement through a shear action of the rubber. Such a structure is illustrated in the application of Hugh C. Lord, Ser. No. 322,470, filed March 6, 1940, Patent No. 2,241,408 issued May 13, 1941.

In some environments it is desirable to vary the resistance from one mode of vibration as distinguished from another. In the present invention this is accomplished while still permitting such freedom as may be desirable for the different modes of vibration.

As exemplified, the present invention is shown as supporting an airplane engine in overhung relation in which the mountings are arranged around the axis of the engine and are directed to respond to torsional disturbances and to the pitch and yaw of the engine through mounting members having opposing faces between which the rubber supporting the engine and responding to the vibration is placed. As exemplified, these faces are substantially at right angles to a focal line leading to a point approximately at the axis of rotation of the engine adjacent the center of gravity.

In the present structure the contour of these faces is varied, making the resistance to torque impulses greater than the resistance to pitch and yaw, but the direction of greater resistance may be varied as desired. Features and details of the invention will appear from the specification and claims.

A preferred embodiment of the invention is illustrated in the accompanying drawings as follows:

Fig. 1 shows a side elevation of an airplane engine, parts being broken away to better show construction.

Fig. 2 a section on the line 2—2 in Figs. 1 and 4.

Fig. 3 a plan view of the mounting.

Fig. 4 a section on the line 4—4 in Fig. 2.

Fig. 5 a similar section to that of Fig. 3 on the line 5—5 in Fig. 6 with the mounting offset in response to vibratory thrust.

Fig. 6 a section on the line 6—6 in Fig. 5.

1 marks an airplane engine, $x$—$x$ the approximate rotative axis of the engine, 2 an engine supporting ring carried by struts or frame supports 3. Pedestals 4 are secured circumferentially around the engine, ordinarily to the rear of the center of gravity, marked c. g. in Fig. 1.

A mounting 5 is secured to the pedestal 4 and to the bracket 2' on the ring. The focal line 6—7' extends from the focal point 6 through the mounting. This focal line, as illustrated, is at an angle to the axis $x$—$x$ of approximately 35°, although this may be varied.

A propeller 8 is carried on the forward part of the engine in the usual manner and its vibrational characteristics are added to those of the engine to be quieted by the arrangement of the mountings.

The mounting comprises links converging on the focal point. Spherical units form swinging joints for each of the ends of the links. These joint units have cores 9 and 9', the spherical centers really forming the swinging centers of the links and the distance between these centers establishes the effective length of the links. Spherical plates 11 and 11' are arranged on the concave sides of the cores, and a center plate having spherical portions 12 and 12' are opposed to the convex sides of the cores, these plates being arranged between the cores. The plates 11 and 11' have flanges 13 and 13' and these are internally screw threaded and screwed onto a screw threaded tube 14', the tube thus uniting the flanges 13 and 13' and the plates 11 and 11'. The center plates 12 and 12' have circumferential flanges 14 which are in contact with each other. It will be seen, therefore, that the plates 11 and 11' and 12 and 12' are united and in effect form a rigid member. The axis of this rigid frame member swings on the link centers formed at the centers of the spherical surfaces of the core and this axis is always in alignment with these centers. It is, in fact, the link.

Rubber or resilient material 15 and 15' is arranged in the spaces between the cores 9 and 9' and the plates 11 and 11' and similar rubber layers 16 and 16' are arranged between the cores 9 and 9' and the center portions 12 and 12'. The rubber is bonded to the engaged surfaces preferably during vulcanization so as to retain the rubber in place as it is stressed in shear by the swinging of the surfaces.

The cores 9 and 9' have stems or projections 17 and 17' respectively. The plates 11 and 11' have openings $17^2$ and $17^3$ affording clearance between the stems and the plates to permit movement of the cores. Preferably the cores are provided with bolts 18 and 18' from which the stems project.

The pedestal 4 has a centering projection 19 on its base 4' to assist in definitely locating it with relation to the engine, and the base is provided with perforations 20 through which securing cap screws 21 extend. The pedestal has a perforation 22, the axis of which may be in alignment with the focal line, which perforation receives the stem 17, and a nut 23 is arranged on the end of the stem, locking the stem in the pedestal.

An adapter 24 is provided with an opening 25 through which the stem 17' extends, this opening having its axis preferably on the focal line. The stem is secured in the adapter by a nut 26. The adapter has a shank 27 which extends through an opening 28 in the bracket 2' and this shank is secured in the bracket by a nut 29. It will be noted that the axis of the shank 27 extends to the center of the core 9' so that there is no turning movement exerted on the shank.

The rubber at 30 extends around the ends of the core and the rubber as a whole is spaced from the frame parts. With an extreme movement of the core, the rubber 30 contacts the frame and forms a limiting stop. With this structure the links swing on the link centers to permit an angular freedom of movement of the engine and the rubber yields to this movement through edgewise or shear action on the rubber. The invention so far as specifically described, follows that of the application of Hugh C. Lord above referred to.

In the present invention, the cores are provided with grooves 31 and 31' on their convex surfaces. The center plates 12 and 12' are provided with ribs 32 and 32' which extend into the grooves 31 and 31', that is there are surfaces 33 and 33' on the cores which are opposed to surfaces 34 and 34' on the center plates 12 and 12' and these surfaces, depending on the abruptness of the ribs and grooves and contour, obstruct or reduce the shear freedom of the rubber in the direction crosswise of the grooves and ribs, consequently the resistance to movement in this crosswise direction is increased over a movement lengthwise of the ribs. By varying the depth of the grooves or ribs, the extent of this variation may be varied.

It is usually desirable, placed as the mountings are placed in the exemplification here shown, to have the mountings more resistant to torsional thrusts than to pitch and yaw thrusts, and to accomplish this the mountings in the structure are so placed that the ribs and grooves extend laterally from the axis $x$—$x$ so that the torque thrust is crosswise of these ribs and grooves. As to torsional thrusts, all the ribs and grooves obstruct equally through the circle. As to the pitch and yaw, it will be noted that these directions do not all conform to the directions of thrusts, thus the top and bottom mountings have their ribs and grooves in alignment with the pitch movement whereas the side mountings have their ribs and grooves crosswise of the pitch movement. Thus, so far as pitch is concerned, the rib and groove increase is confined to one-half the mountings and consequently the increase by reason of the ribs resisting pitch (or yaw) is less than that resisting torque. Thus by a mere arrangement of the direction and relation of the mountings, a preponderance of resistance may be made in any direction desired to satisfy the requirement.

While we have shown this structure of the general sandwich type as applied to the spherical joints of a link structure, I do not wish to be limited as to the broader phases of the invention to this specific type, or link type, of such mountings.

What I claim as new is:

1. In a mounting assembly, a vibratory body having induced torsional vibrations and vibrations transverse thereto, a mounting means attached thereto for supporting the body comprising a series of mounting units arranged about the axis, members having opposing faces and a resilient element secured between and to the faces and having portions subjected to shear with an edgewise movement of the members, the face contours having variations varying the shear fredom of the element between the members, the contour variations making the resistance of the element in one edgewise direction of movement of the members greater than the resistance to the movement in another edgewise direction, the contour variations being disposed with relation to each other to make the torsional resistance greater than the resistance to vibrations transverse to the torsional vibrations.

2. In a mounting assembly, a vibratory body having induced torsional vibrations and vibrations transverse thereto, a mounting means attached thereto for supporting the body comprising a series of mounting units arranged about the axis, members having opposing faces and a resilient element secured between and to the faces and having portions subjected to shear with an edgewise movement of the members, the face contours having variations varying the shear freedom of the element between the members, the contour variations making the resistance of the element in one edgewise direction of movement of the member greater than the resistance to movement in another edgewise direction, the faces being at right angles to focal lines leading to a focal point offset from the mountings and the variations of contour being disposed to make the resistance to pitch and yaw movements less than the torsional movements about the focal point.

3. In a mounting assembly, a vibrating body adapted for overhung suspension on an upright support having induced torsional vibrations and vibrations transverse thereto, a mounting means attached thereto for supporting the body in overhung relation to such a support comprising a series of mounting units arranged about the axis, members having opposing faces and a resilient element secured between and to the faces and having portions subjected to shear with an edgewise movement of the members, the face contours having variations varying the shear freedom of the element between the members, the contour variations making the resistance of the element in one edgewise direction of movement of the member greater than the resistance to movement in another edgewise direction, the faces being at right angles to focal lines leading to a focal point offset from the mountings and the variations of contour being disposed to make the resistance to pitch and yaw movements less than the torsional movements about the focal point.

4. A mounting comprising members having opposing spherical faces and a resilient element secured between and to the faces and having portions subjected to shear with an edgewise rocking movement of the members, the face contours having variations varying the shear freedom of the element between the members, the contour variations placing the major portion of the element in unobstructed free shear relation in one edge direction and making the resistance of the element in one edgewise direction of movement of the members greater than the resistance to movement in another edgewise direction.

5. A mounting comprising members having opposing spherical faces and a resilient element secured between and to the faces and having portions subjected to shear with an edgewise rocking movement of the members, the face contours having variations in the form of opposing shoulders placing the major portion of the element in unobstructed free shear relation between the faces and extending in one general direction varying the shear freedom of the element between the members, the shoulders making the resistance of the element in one edgewise direction of movement of the members greater than the resistance to movement in another edgewise direction.

6. A mounting link having its ends cushioned in resilient material such as rubber operating between spherical joint elements accommodating through its distortion the swinging of the joints, the face contours having variations varying the shear freedom of the elements between the members, the contour variations placing the major portion of the element in unobstructed free shear relation in one edge direction and making the resistance of the elements in one swinging direction of the links greater than the resistance to another swinging direction of the links.

7. A mounting link having its ends cushioned in resilient material such as rubber operating between spherical joint elements accommodating through its distortion the swinging of the joints, the face contours having variations in the form of opposing shoulders placing the major portion of the element in unobstructed free shear relation between the faces and extending in one general direction varying the shear freedom of the elements between the members, the shoulders making the resistance of the elements in one swinging direction of the links greater than the resistance to another swinging direction of the links.

8. In a mounting assembly, a vibratory body adapted for overhung suspension on an upright support, a suspension attached to the body for supporting the body in overhung relation to such a support, a series of three or more links horizontally and vertically spaced converging toward each other, the ends of the links being cushioned in resilient material such as rubber operating between spherical joint elements accommodating through its distortion the swinging of the joint, the face contours of the spherical joints having variations varying the shear freedom of the element between the members, the contour variations making the resistance of the element in one edgewise direction of movement of the member greater than the resistance to movement in another edgewise direction, the variation of contour being disposed with relation to each other to make the resistance to one mode of vibration different from the resistance to another mode of vibration causing movement in each instance in an edgewise direction of the spherical faces.

9. In a mounting assembly, a vibratory body adapted for overhung suspension having induced torsional and angular vibrations, a mounting means attached thereto for supporting the body comprising a series of three or more links horizontally and vertically spaced and converging toward each other, the ends of each link being cushioned in resilient material such as rubber operating between spherical joint faces accommodating through its distortion the swinging of the links, the face contours having variations varying the shear freedom of the element in different edgewise directions of movement between the members, the contour variations making the resistance of the element in one edgewise direction of movement of the member greater than the resistance to movement in another edgewise direction to vary the resistance to torsional and angular vibratory forces.

10. In a mounting assembly, a vibratory body adapted for overhung suspension having induced torsional and angular vibrations, a mounting means attached thereto for supporting the body comprising a series of three or more links horizontally and vertically spaced and converging toward each other, the ends of each link being cushioned in resilient material such as rubber operating between spherical joint faces accommodating through its distortion the swinging of the links, the face contours having variations in the form of opposing shoulders varying the shear freedom of the element in different edgewise directions of movement between the members, the contour variations making the resistance of the element in one edgewise direction of movement of the member greater than the resistance to movement in another edgewise direction to vary the resistance to torsional and angular vibratory forces.

RICHARD C. HENSHAW.